United States Patent [19]

Loomer

[11] Patent Number: 4,595,332

[45] Date of Patent: Jun. 17, 1986

[54] SHUTTLE

[75] Inventor: Weston R. Loomer, Florence, Ky.

[73] Assignee: Litton Systems, Inc.

[21] Appl. No.: 504,416

[22] Filed: Jun. 15, 1983

[51] Int. Cl.[4] .............................................. B66F 9/14
[52] U.S. Cl. ..................................... 414/663; 414/282
[58] Field of Search ............... 414/282, 662, 663, 664, 414/668

[56] References Cited

U.S. PATENT DOCUMENTS

| 3,549,025 | 12/1970 | Messner | 414/282 |
| 3,606,039 | 9/1971 | Weston et al. | 414/283 |
| 3,632,001 | 1/1972 | Richens et al. | 414/661 |
| 3,848,754 | 11/1974 | Bryntse | 414/749 |
| 3,892,324 | 7/1975 | Faletti, Jr. | 414/749 |
| 3,913,766 | 10/1975 | Wentz | 414/282 X |

FOREIGN PATENT DOCUMENTS 603738  8/1960  Canada ................ 414/477

Primary Examiner—Robert J. Spar
Assistant Examiner—S. Millman
Attorney, Agent, or Firm—Morris I. Pollack

[57] ABSTRACT

A stacker-retriever lift carriage is disposed to be raised, lowered and positioned, in selected positions with respect to a pair of spaced support masts, by a flexible wire cable connected between a lift drive and the lift carriage. The lift carriage carries a telescoping shuttle which includes a shuttle base, middle table and top table disposed one atop the other and for movement with respect to each either in a bi-directional manner. A pair of sheaves are rotatably mounted on the middle table at an acute angle to the surface of the middle table. A pair of cable connect the sheaves to the shuttle base and top table so that drive of the middle table, by a table drive mechanism, in a particular direction effects a movement of the top table in a corresponding direction but at twice the relative distance of the middle table. The middle table is fabricated from a pair of identically sized and formed table plates; has a pair of flaps bent therefrom to an acute angle with respect to a top surface of the table plate. The table plates are affixed together in back to back relationship and with their respective flaps aligned to form the mounting for the sheaves.

12 Claims, 5 Drawing Figures

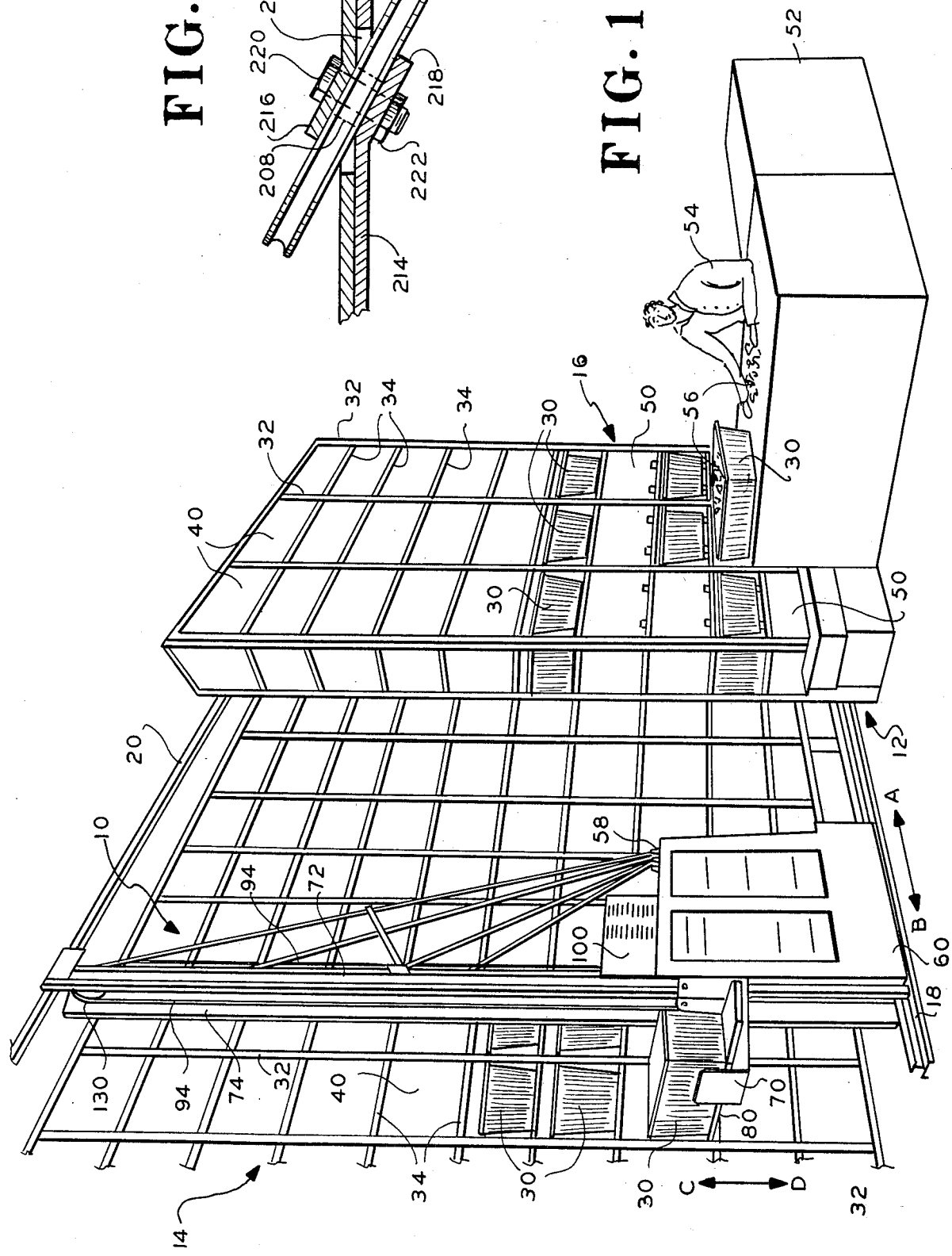

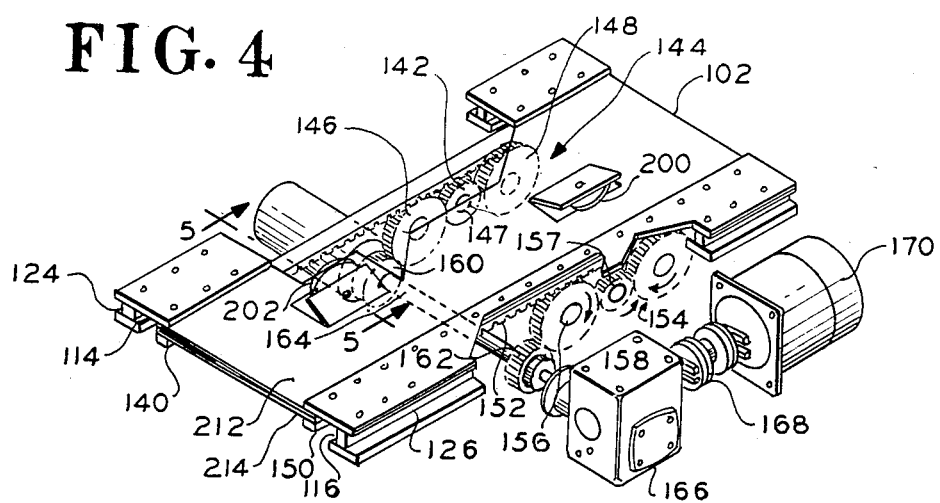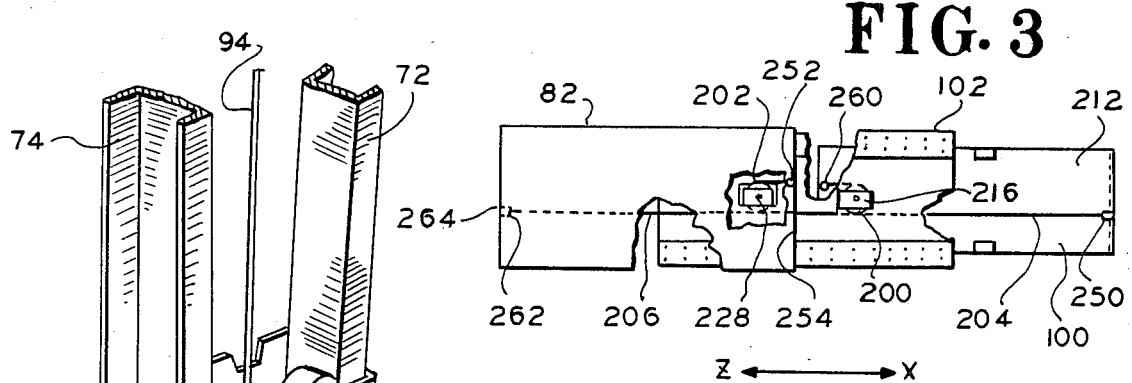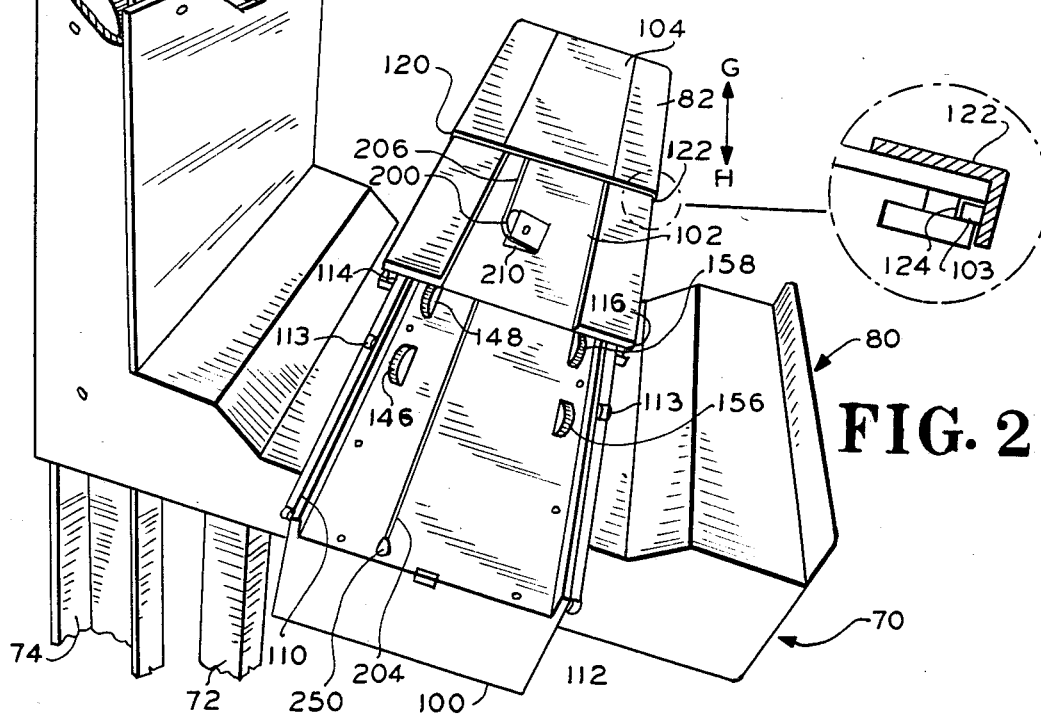

SHUTTLE

BACKGROUND OF THE INVENTION—FIELD OF APPLICATION

This invention relates to shuttles; and more particularly, telescoping shuttles for material handling.

BACKGROUND OF THE INVENTION—DESCRIPTION OF THE PRIOR ART

Material handling equipment, especially unit material handling equipment such as stacker cranes, stacker-retrievers, and other load carrying devices, quite often are captive or restricted in their movement along a prescribed path. The restricting means may be a set of rails, that cooperate with path guide structure carried by the equipment to move along a prescribed path of movement that is usually a straight line such as an aisle in a material storage warehouse or area. Other forms of guide means include tracks buried in floors, walls, ceilings and the like that are sensed by equipment carried by the material handling equipment and guide the movement along a prescribed path that may not be a straight line.

Most of such material handling or carrying vehicles are constructed to carry their load in a position which is centrally disposed to facilitate balancing of the carrying vehicle while it is traveling the prescribed path. Central location of the load on the vehicle while the vehicle is moving also enables the vehicle to travel a path which is relatively narrow such an an aisle in a material storage warehouse or a material storage area. When one considers the cost of: buying land for space, constructing buildings, heating, lighting, and air conditioning of space then it becomes quite important to utilize spaces as efficiently as possible. The narrowest possible aisles and paths of movement leave a maximum amount of space for material storage and other purposes such as material handling and manufacturing and assembly areas.

However, the materials to be carried by the vehicle need to be placed upon the vehicle for transport. Many automated and semi-automated vehicles are equipped with material pick-up mechanisms that can be extended from the vehicle to retrieve or otherwise pick-up the goods and which are then retracted to locate the goods in a central location on the vehicle for subsequent transport by the vehicle. Quite often such material pick-up mechanisms take the form of a shuttle or fork which is extended from a central disposition on the vehicle to pick up material and which is retracted back to its central location on the vehicle after it has obtained the material or after it has deposited the material in a designated location.

Increasing the reach of such shuttles or forks has been accomplished by constructing the shuttle with more than one table like carrier and interconnecting the carriers for conjoint movement with respect to the vehicle and with respect to each other in a telescoping manner. Many such shuttles can be extended from and retracted from both one side and the other side of the load carrying vehicle in a bi-directional manner.

Shuttle mechanisms such as those shown in U.S. Pat. No. 3,606,039 and in U.S. Pat. No. 3,632,001, however are relatively complex in construction and operation and utilize an inordinate amount of gearing and drives which add to the expense of manufacture and maintenance. These shuttles, in addition, due to their form of construction and the components required to make the shuttles function are relatively cumbersome and large; especially in the relative height required to house and position the shuttle operating elements. As set forth previously, space costs money and takes time and money to travel along. The higher the shuttle mechanism the less space available to store materials since in many of the available systems the shuttle must move under the material to be stored or retrieved and space must t:erefore be provided to so accommodate the shuttle mechanism. Shuttle mechanisms, such as those shown in U.S. Pat. No. 3,848,754 and in U.S. Pat. No. 3,892,324 attempt to eliminate as much of the relatively expensive and space consuming chain and gearing as possible but still provide shuttles which are relatively complex in construction and therefore to manufacture, and which also are relatively thick in the height or vertical dimension.

SUMMARY OF THE INVENTION

It is therefore an object of this invention to provide a new and improved shuttle.

It is another object of this invention to provide a new and improved telescoping shuttle.

It is still another object of this invention to provide a new and improved telescoping shuttle for material handling equipment.

It is yet still another object of this invention to provide a new and improved telescoping shuttle for a stacker-retriever.

It is a further object of this invention to provide a new and improved middle table for a telescoping shuttle.

This invention involves telescoping shuttles for material handling vehicles such as stacker cranes, stacker-retrievers, and the like, and contemplates: constructing same so as to minimize the height taken up by the shuttle by disposing the pulleys or sheaves around which the cables wrap, which facilitate telescoping of the shuttle at an angle to the horizontal, but one which is less than ninety degrees; by constructing the shuttle so that the sheaves are carried by a middle table and by constructing the middle table with a pair of identically formed plate members disposed back to back and formed to cooperate together to rotatably mount therebetween the cable sheaves at an angle to the horizontal.

Other objects, features, and advantages of the invention in its details of construction and arrangement of parts will be seen from the above, from the following description of the preferred embodiment when considered with the drawings and from the appended claims.

BRIEF DESCRIPTION OF THE DRAWINGS

In the Drawings:

FIG. 1 is a fragmentary perspective view of a warehousing system utilizing a vertical lift in the form of a stacker-retriever which incorporates the instant invention;

FIG. 2 is an enlarged fragmentary perspective view of the lift carriage assembly including the shuttle assembly, and the support masts for the stacker-retriever of FIG. 1;

FIG. 3 is a schematic plan view of the shuttle with the top and middle tables in their fully extended telescoped position;

FIG. 4 is a perspective showing of the shuttle drive train and middle shuttle table for the shuttle of FIG. 3; and FIG. 5 is an enlarged fragmentary sectional view taken on line 5—5 of FIG. 4 to better show details of the middle table construction and mounting of the cable sheaves.

DESCRIPTION OF THE PREFERRED EMBODIMENT

For convenience, the invention will be described as applied to a stacker-retriever which is automatically controlled to move along an aisle between opposed racks arranged and spaced to store totes within which parts, components, sub-assemblies, assemblies and the like are disposed. The stacker-retriever includes a lift carriage assembly that is vertically positionable at any one of a predetermined number of different levels, and incorporates a bi-directional shuttle assembly that can be extended to retrieve a tote, retracted to position the tote for transport to another location, and extended in the opposite direction, if desired, to deposit the tote on a rack for positioning at a workstation, or to deposit the tote at another rack location or in its original location if the tote is being returned from a workstation. A flexible member in the form of a wire cable extends from a power drive to the lift carriage assembly to raise, lower and maintain the vertical lift position of the lift carriage. It being understood, nevertheless, that without departing from the scope of this invention: that the flexible member can be chain or any other suitable flexible member; that the stacker-retriever can be operator as well as automatically controlled; that subject shuttle assembly can be utilized on stacker cranes, on vertical lifts other than stacker-retrievers and on material handling equipment that does not have a vertically movable component; that the item being stored, delivered and retrieved need not be a tote but can be the article itself or a pallet load of goods; that there may be any number of aisles and cranes; and that the shuttle table need not be bi-directional.

With reference to FIG. 1, there is generally shown at 10 a stacker-retriever disposed for movement in the direction of arrows A-B in an aisle 12 between a first rack assembly 14 and a second rack assembly 16. A lower guide rail 18 and an upper guide rail 20 guide such movement of stacker-retriever 10 in aisle 12. Rack assemblies 14, 16, together with stacker-retriever 10 form an automated storage and retrieval system for items (not shown) in totes 30; which items can be parts, subassemblies, assembies, tools, jigs, fixtures, and the like.

Rack assemblies 14, 16 are of conventional construction and include vertical members 32 and shelf members 34 with associated support members all assembled together to form the rack assemblies so as to provide a number of storage positions 40 each sized to receive a tote 30. Rack assembly 16, can additionally include a number of access positions 50 that are constructed in a conventional manner with roller-type conveyor rolls (not shown) so that if a tote 30 is deposited in a position 50 it will roll forward near or onto a workstation 52 where an operator 54 will have access to tote 30 to either remove items 56 therefrom or place such items 56 in totes 30. Tote 30 is then returned by stacker-retriever 10 and returned to its original location 40 in either rack assembly 14 or rack assembly 16.

The removal of a tote 30 from a particular storage location 40 and its movement to a particular access location 50 is accomplished by drives, mechanisms and controls 58, of conventional construction, and which are located in cabinet 60 of stacker-retriever 10. During its movement in the direction of arrows A and B along aisle 12 stacker-retriever 10 is guided by lower guide rail 18 and upper guide rail 20; both of which are of conventional construction.

Stacker-retriever 10 carries a lift carriage assembly 70 (FIGS. 1 and 2) disposed for vertical movement (in the direction of arrows C-D, FIG. 1) and guided in such movement by a pair of supports masts 72, 74 (FIGS. 1 and 2) of generally "U" shaped channel construction. A shuttle table assembly 80, incorporated into lift carriage assembly 70, includes top shuttle table 82 and appropriate drives and controls to be hereinafter described to move top shuttle table 82 in the direction of arrows G-H (FIG. 2). Such movement enables top shuttle table 82 to extend beneath and pick up a tote 30 from a particular storage location 40, to remove the selected tote 30 from its storage location 40 and to bring tote 30 into a centered position onto lift carriage assembly 70. When so positioned lift carriage assembly 70 may be moved up or down (in the directions of arrow C-D, FIG. 1) as desired; and stacker-retriever 10 may be moved along aisle 12 until lift carriage assembly 70 is aligned with either a different storage location 40 or an access location 50. Such movement of stacker-retriever 10 is under controls 58 which also operate shuttle table assembly 80 to extend shuttle table 82 and deposit tote 30 in a desired location.

The vertical movement of lift carriage assembly 70 is accomplished by a vertical drive assembly (not shown) which is disposed on top of or as part of cabinet 60; and which is connected by a wire cable 94 (FIGS. 1 and 2) to lift carriage assembly 70 to raise, lower and maintain the position of lift carriage assembly 70 to and at selected positions corresponding to storage locations 40 and access locations 50; as well as positions therebetween if so selected. Suitable controls and mechanisms are disposed in cabinet 60 and on lift carriage assembly 70 to facilitate positioning of lift carriage assembly 70.

Shuttle assembly 80 is of the telescoping type and includes a shuttle base 100 (FIGS. 2 and 3), a middle shuttle table 102 and a top shuttle table 82. Shuttle base 100 includes a pair of rib members 110, 112 (FIG. 2) disposed along the side edges thereof and upon which are mounted rollers 113 ride in inner grooves 114, 116 (FIG. 4) respectively to permit longitudinal movement of middle table 102 with respect to shuttle base 100; while preventing vertical separation thereof as long as they are in an overlapping and telescoping relationship. Top table 82 includes a pair of downwardly extending ribs 120, 122 (FIG. 2) disposed along the side edges thereof and upon which are mounted rollers 123 which ride in outer grooves 124, 126 (FIG. 4) respectively that extend along each outer edge of middle table 102 to permit longitudinal movement of middle table 102 and top table 82 with respect to each other while preventing vertical separation thereof as long as they are in an overlapping and telescoping relationship.

A first toothed rack 140, (FIG. 4) is carried by middle table 102; with its rack teeth 142 extending along the length of table 102 and facing downwardly for meshing engagement with a first gear set 144 mounted withing shuttle base 102 so that the teeth of gears 146, 148 of gear set 144 extend above the upper surface of shuttle base 102 and into meshing engagement with rack teeth 142. A second toothed rack 150 is carried by middle table 102 in spaced relationship with rack 140; and with its rack teeth 152 facing downwardly for meshing engagement with a second gear set 154 mounted within shuttle base 102 so that the teeth of gears 156, 158 of gear set 154 extend above the upper surface of shuttle base 102 and into meshing engagement with rack teeth 152. A pinion gear 147 is disposed between gears 146, 148 so that they rotate in the same direction. Similarly a pinion gear 157 is disposed between gears 156 and 158 so that they rotate in the same direction.

Gears 146, 147, 148, 156, 157, and 158 are all suitably mounted on shafts (not shown) disposed within shuttle base 102. Gears 146, 148, 156, 158 are disposed with respect to racks 140, 150 so that at least one gear from each set is always in meshing engagement with the teeth on its respective rack; and so that at least sometimes both gears of each gear set are in meshing engagement with their respective racks.

Gear sets 144, 154 are driven by the engagement between gears 146, 156 with drive gears 160, 162 respectively carried by a drive shaft 164; all of which are disposed in shuttle base 102. Drive shaft 164 is suitably coupled to the output shaft of a reducer 166. The input shaft of reducer 166 is connected through a flexible coupling 168 to a stepping motor 170. Stepping motor 170, coupling 168, and reducer 166 are disposed within a housing 172 (FIG. 2) disposed to the side of shuttle base 102 and which is part of lift carriage assembly 70. Suitable electrical and control signal connections are provided between stepping motor 170 and controls 58 within cabinet 60.

The telescoping action of top table 82 and middle table 102 with respect to each other and with respect to shuttle base 100 is accomplished by a pair of sheaves 200, 202 (FIG. 3 and 4) and a pair of nylon coated steel cables 204, 206 respectively. Sheave 200 on a bushing 208 is disposed in a sheave opening 210 (FIG. 5) formed between an upper table plate 212 and a lower table plate 214 of middle table 102. Opening 210 is formed by bending from table plates 212 and 214 sheave mounting flaps 216, 218 respectively. Flaps 216, 218 are formed by first punching, notching or otherwise cutting from table plates 212, 214 three sides of a four sided rectangle and bending or otherwise forming flaps 216, 218 from the metal of table plates 212, 214 by bending same about the fourth side of said rectangle. A cap screw 220 and a nut 222 secure bushing 208 and sheave 200 in position.

Sheave 202 is disposed in a sheave opening (not shown) also formed, in a manner similar to sheave opening 210, between upper plate 212 and lower plate 214 but with the sheave opening for sheave 202 spaced from sheave opening 210. The opening for sheave 202 is also formed by bending from plates 212 and 214 a pair of sheave mounting flaps 228 (only one shown) in the same manner that flaps 216, 218 were formed for sheave 200. A cap screw (not shown) and a nut (not shown) secure the bushing and sheave 202 in position.

Table plates 212, 214 are identical in construction and their respective flaps 216, 218 and 228 extending in the same direction when plates 212, 214 and flaps 216, 218 and 228 are formed. Thus when middle table 102 is fabricated a pair of identical plates are utilized and only a single set of tooling need be made to fabricate same. Obviously only a single part has to be made and inventoried. The pair of identical plates are however assembled with a back surface 230 of plate 212 disposed against a back surface 232 of plate 214. The angle at which flaps 216, 218 and 228 are struck is between 5 and 10 degrees to the horizontal, but may be of any suitable acute angle. Flaps 216 and 218 are struck at identical angles and when table plates 212, 214 are assembled back to back flaps 216, 218 will be disposed one parallel to the other. Additionally, since sheaves 200, 202 are disposed at an acute angle with respect to the horizontal the spacing between middle table 102 and top table 82 and their respective heights is minimized to reduce the access space within each rack column and maximize space available for storage.

Cable 204 (FIGS. 2 and 3) has one of its ends secured to a cable stud 250 carried by shuttle base 100, extends from stud 250 around sheave 202 as shown in FIG. 3, and has its other end secured to a cable plug bracket 252 carried by top table 82 at an end 254 thereof. Cable 206 (FIGS. 2 and 3) has one of its ends secured to a cable stud 260 (FIG. 3) carried by shuttle base 100, extends from stud 260 around sheave 200 as shown in FIG. 3, and has its other end secured to a cable plug bracket 262 carried by top table 82 at an end 264 thereof. Cable studs 250, 260 are in the form of take-ups and are connected to their respective cables to facilitate tightening and loosening therof.

The spacing of sheaves 200, 202 from each other, the length and anchoring of cables 204, 206 and the arrangement thereof produces multiplication of effect of the motion of tables 102, 82 with respect to base 100. Top table 82 will move twice as far as middle table 102 moves.

Thus upon actuation of stepping motor 170 the drive there from will extend through coupling 168 to reducer 166 to turn the output shaft thereof and thereby transmit power to shuttle drive shaft 164 and pinions 160, 162 carried thereby. Pinions 160, 162 will drive gear sets 144, 154 and racks 140, 150 to move middle shuttle table 102 in a predetermined direction. When middle table 102 is thus driven in the direction of arrow X sheave 200 will pull top table 82 in the direction of arrow X through cable 206. When middle table 102 is driven in the direction of arrow Z sheave 202 will pull top table 82 in the direction of arrow Z through cable 204.

From the above description it will thus be seen that there has been provided a new and improved telescoping shuttle which is relatively simple in construction and operation and which has its components disposed so as to minimize the height of the shuttle.

It is understood that although I have shown the preferred embodiment of my invention that various modifications may be made in the details thereof without departing from the spirit as comprehended by the following claims.

I claim:

1. A telescoping shuttle; comprising:
 (a) shuttle base means;
 (b) first table means carried by said shuttle base means for movement with respect to said shuttle base means along a predetermined path between a first position and a second position;
 (c) second table means carried by said first table means for movement with respect to said first table means between a third position and a fourth position;
 (d) first sheave means rotatably mounted on said first table means by first mounting means;
 (e) first flexible member means having a first end connected to said shuttle base means at a first predetermined location thereon and extending therefrom around at least a portion of said first sheave means and having a second end connected to said second table means at a first predetermined location thereon;

(f) second sheave means rotatably mounted on said first table means in aligned but spaced relationship to said first sheave means by second mounting means;

(g) second flexible member means having a first end connected to said shuttle base at a second predetermined location on said shuttle base, and extending therefrom around at least a portion of said second sheave means and having a second end connected to said second table means at a second predetermined location thereon spaced from said first predetermined location on said second table means;

(h) said first mounting means and said second mounting means each comprising flap means formed from the material of said first table means and disposed at a predetermined angle with respect thereto;

(i) said flap means of said first mounting means and said flap means of said second mounting means each comprising a pair of flaps spaced one from the other in substantially parallel relationship to form therebetween a place to rotatably mount the respective first and second sheave means;

(j) said first table means including a first table plate and a second table plate with each of said table plates having formed from the material thereof one of said flaps of said first mounting means and one of said flaps of said second mounting means;

(k) said first table plate and said second table plate each including a first substantially planar surface and a second substantially planar surface and said flaps each extending at a predetermined angle from said first planar surfaces; said first table means being formed by placing said second planar surface of said first table plate in juxtaposition to said second planar surface of said second table plate and with their respective flaps aligned one with the other; attaching means to secure said first table plate to said second table plate;

(l) said first mounting means and said second mounting means rotatably mounting their respective sheaves at said predetermined angle;

(m) said positioning of said first and second sheave means, and said connections for said first and second ends of said first and second flexible member means being selected so that movement of said first table means with respect to said shuttle base in a predetermined direction will produce a movement of said second table means with respect to said first table means in a corresponding direction but at a rate of movement which is a predetermined multiple of the rate of movement of said first table means; and (n) shuttle drive means coacting with said first table means to move same with respect to said shuttle base means.

2. The telescoping shuttle of claim 1, wherein said predetermined angle is an acute angle.

3. The telescoping shuttle of claim 2, wherein said first and said second flexible member means are cables.

4. The telescoping conveyor of claim 1, wherein said first table plate and said second table plate are substantially identical in size, shape, and construction.

5. The telescoping shuttle of claim 4, wherein said first table means is disposed between said shuttle base and said second table means.

6. The telescoping shuttle of claim 1, wherein said shuttle drive means coacts with said first table means to bidirectionally drive same.

7. A stacker-receiver; comprising:
(a) a lift carriage;
(b) a pair of spaced support masts supporting said lift carriage to be raised, lowered, and positioned with respect to said support masts;
(c) a lift carriage drive connected to said lift carriage to so raise, lower and position same;
(d) shuttle means carried by said lift carriage, said shuttle means including:
 (i) shuttle base means;
 (ii) first table means carried by said shuttle base means for movement with respect to said shuttle base means along a predetermined path between a first position and a second position;
 (iii) second table means carried by said first table means for movement with respect to said first table means between a third position and a fourth position;
 (iv) first sheave means rotatably mounted on said first table means by first mounting means;
 (v) first flexible member means having a first end connected to said shuttle base means at a first predetermined location thereon and extending therefrom around at least a portion of said first sheave means and having a second end connected to said second table means at a first predetermined location thereon;
 (vi) second sheave means rotatably mounted on said first table means in aligned but spaced relationship to said first sheave means by second mounting means;
 (vii) second flexible member means having a first end connected to said shuttle base at a second predetermined location on said shuttle base, and extending therefrom around at least a portion of said second sheave means and having a second end connected to said second table means at a second predetermined location thereon spaced from said first predetermined location on said second table means;
 (viii) said first mounting means and said second mounting means each comprising flap means formed from the material of said first table means and disposed at a predetermined angle with respect thereto;
 (ix) said flap means of said first mounting means and said flap means of said second mounting means each comprising a pair of flaps spaced one from the other in substantially parallel relationship to form therebetween a place to rotatably mount the respective first and second sheave means;
 (x) said first table means including a first table plate and a second table plate with each of said table plates having formed from the material thereof one of said flaps of said first mounting means and of said flaps of said second mounting means;
 (xi) said first table plate and said second table plate each including a first substantially planar surface and a second substantially planar surface and said flaps extending at a predetermined angle from said first planar surfaces; said first table means being formed by placing said second planar surface of said first table plate in juxtaposition to said second planar surface of said second table plate and with their respective flaps aligned one with the other; and attaching means to secure said first table plate to said second table plate;

(xii) said first mounting means and said second mounting means rotatably mounting their respective sheaves at said predetermined angle;

(xiii) said positioning of said first and second sheave means, and said connections for said first and second ends of said first and second flexible member means being selected so that movement of said first table means with respect to said shuttle base in a predetermined direction will produce a movement of said second table means with respect to said first table means in a corresponding direction but at a rate of movement which is predetermined multiple of the rate of movement of said first table means; and (xiv) shuttle drive means coacting with said first table means to move same with respect to said shuttle base means.

8. The stacker-retriever of claim 7, wherein said first predetermined angle is an acute angle.

9. The stacker-retriever of claim 8, wherein said first and said second flexible member means are cables.

10. The stacker-retriever of claim 7, wherein said first table plate and said second table plate are substantially identical in size, shape, and construction.

11. The stacker-retriever of claim 10, wherein said first table means is disposed between said shuttle base and said second table means.

12. The stacker-retriever of claim 7, wherein said shuttle drive means coacts with said first table means to bidirectionally drive same.

* * * * *